United States Patent
Peng et al.

(10) Patent No.: US 11,154,154 B2
(45) Date of Patent: Oct. 26, 2021

(54) SPLIT-TYPE ELECTRIC PRESSURE COOKER

(71) Applicant: FOSHAN SHUNDE MIDEA ELECTRICAL HEATING APPLIANCES MANUFACTURING CO.,LTD., Guangdong (CN)

(72) Inventors: Feng Peng, Foshan (CN); Xingguo Yang, Foshan (CN); Rongkang Mo, Foshan (CN)

( * ) Notice: Subject to any disclaimer, the term of this patent is extended or adjusted under 35 U.S.C. 154(b) by 253 days.

(21) Appl. No.: 16/466,285

(22) PCT Filed: Nov. 1, 2017

(86) PCT No.: PCT/CN2017/108939
§ 371 (c)(1),
(2) Date: Jun. 3, 2019

(87) PCT Pub. No.: WO2018/099233
PCT Pub. Date: Jun. 7, 2018

(65) Prior Publication Data
US 2020/0000263 A1    Jan. 2, 2020

(30) Foreign Application Priority Data

Dec. 2, 2016   (CN) .......................... 201611110267.1
Dec. 2, 2016   (CN) ......................... 201621316295.4

(51) Int. Cl.
*A47J 27/08* (2006.01)
*A47J 27/09* (2006.01)
(Continued)

(52) U.S. Cl.
CPC ......... *A47J 27/0802* (2013.01); *A47J 27/086* (2013.01); *A23L 7/1975* (2016.08);
(Continued)

(58) Field of Classification Search
CPC .......................... A47J 27/092; A47J 27/0802
See application file for complete search history.

(56) References Cited

U.S. PATENT DOCUMENTS

| 4,420,716 | A | * | 12/1983 | Imazeki | .................... H02P 7/04 |
| | | | | | 318/258 |
| 4,799,914 | A | * | 1/1989 | Hutchinson | ............ A63H 27/10 |
| | | | | | 244/30 |

(Continued)

FOREIGN PATENT DOCUMENTS

| CN | 101185556 | A | | 5/2008 |
| CN | 201612491 | U | * | 10/2010 |

(Continued)

*Primary Examiner* — Jorge A Pereiro
(74) *Attorney, Agent, or Firm* — Kilpatrick Townsend & Stockton (57) ABSTRACT

Disclosed is a split-type electric pressure cooker. The cooker comprises a cooker body and a cooker lid, the cooker body being provided with a power supply device. The split-type electric pressure cooker further comprises: a mechanical vent valve, comprising a valve seat and a valve cover, wherein the valve seat is fixedly mounted on the cooker lid, and the valve cover can be movably mounted on the valve seat; a power transmitting device mounted on the cooker body and able to be electrically connected to the power supply device; a power receiving device mounted on the cooker lid; and a motor driving device mounted on the cooker lid and electrically connected to the power receiving device, the motor driving device being used for driving the valve cover to move so as to open or close the mechanical vent valve. With the cooperation of the power transmitting device and the power receiving device, the power transmission is realized between the cooker body and the cooker lid.

16 Claims, 7 Drawing Sheets

(51) Int. Cl.
*A47J 36/00* (2006.01)
*A47J 27/086* (2006.01)
*A23L 7/10* (2016.01)
*A47J 27/04* (2006.01)

(52) U.S. Cl.
CPC ............... *A47J 27/09* (2013.01); *A47J 36/00* (2013.01); *A47J 2027/043* (2013.01)

(56) References Cited

U.S. PATENT DOCUMENTS

| | | | | |
|---|---|---|---|---|
| 7,154,069 | B1* | 12/2006 | Gordon | A47J 27/0817 219/440 |
| 8,432,125 | B2* | 4/2013 | Takada | H02J 7/025 320/104 |
| 9,496,746 | B2* | 11/2016 | Mi | H01F 27/2871 |
| 9,917,478 | B2* | 3/2018 | Ichikawa | H02J 50/12 |
| 9,948,145 | B2* | 4/2018 | Sealy | H02J 7/0068 |
| 2010/0127659 | A1* | 5/2010 | Klinghult | H02J 7/025 320/108 |
| 2012/0080957 | A1* | 4/2012 | Cooper | H02J 50/00 307/104 |
| 2012/0112553 | A1* | 5/2012 | Stoner, Jr. | H02J 50/70 307/104 |
| 2016/0118810 | A1* | 4/2016 | Park | H02J 7/0013 307/104 |
| 2016/0135636 | A1* | 5/2016 | Song | A47J 27/086 219/431 |
| 2017/0149286 | A1* | 5/2017 | Joye | H02J 7/045 |
| 2017/0222490 | A1* | 8/2017 | Boys | B60L 53/124 |
| 2017/0264144 | A1* | 9/2017 | Park | H02J 50/80 |
| 2018/0048189 | A1* | 2/2018 | Park | H02J 7/0013 |
| 2018/0219422 | A1* | 8/2018 | Lee | H02J 50/70 |
| 2019/0305826 | A1* | 10/2019 | Park | H02J 50/10 |

FOREIGN PATENT DOCUMENTS

| | | | |
|---|---|---|---|
| CN | 202287758 U | | 7/2012 |
| CN | 202341762 U | | 7/2012 |
| CN | 202408447 U | | 9/2012 |
| CN | 203885262 U | * | 10/2014 |
| CN | 205083264 U | | 3/2016 |
| JP | 2007175324 A | | 7/2007 |
| WO | WO-2017049635 A1 | * | 3/2017 ............. A47J 27/09 |

* cited by examiner

SPLIT-TYPE ELECTRIC PRESSURE COOKER

PRIORITY CLAIM AND RELATED APPLICATION

The present disclosure is a national phase application of International Application No. PCT/CN2017/108939, filed on Nov. 1, 2017, which claims the priority of Chinese Application No. 201611110267.1, filed in the Chinese Patent Office on Dec. 2, 2016, and claims the priority of Chinese Application No. 201621316295.4, filed in the Chinese Patent Office on Dec. 2, 2016, the entireties of which are herein incorporated by reference.

FIELD

The present disclosure relates to the field of cooking appliances and, more particularly, to a split-type electric pressure cooker.

BACKGROUND

As the cooker lid portion and the cooker body portion of the existing split-type electric pressure cookers can be completely separated and both portions cannot communicate each other through wires, the transmission of current and electric signals cannot be realized between the cooker lid portion and the cooker body portion. Therefore, the existing products are equipped with a manual mechanical vent valve on the cooker lid to achieve the functions of venting. When users need to control vent valve for venting, they can only directly toggle vent valve for venting or press the vent button designed in the cooker lid portion for venting. Since the operation is performed close to the vent valve, users' hands are easily scalded by steam when carrying out venting operations.

SUMMARY

The present disclosure is directed to solving at least one of the problems in the prior art. Accordingly, an object of the present disclosure is to provide a split-type electric pressure cooker having high safety for venting.

To achieve the foregoing object, the present disclosure provides a split-type electric pressure cooker, comprising a cooker body and a cooker lid cooperating with the cooker body, the cooker body being provided with a power supply device. The split-type electric pressure cooker further comprises: a mechanical vent valve, comprising a valve seat and a valve cover, wherein the valve seat is fixedly mounted on the cooker lid, and the valve cover may be movably mounted on the valve seat; a power transmitting device mounted on the cooker body and able to be electrically connected to the power supply device, and the power transmitting device is used to transmit power to the power receiving device; a power receiving device mounted on the cooker lid; and a motor driving device, comprising a driving motor mounted on the cooker lid and electrically connected to the power receiving device, and the motor shaft of the driving motor is capable of driving the valve cover to move so as to open or close the mechanical vent valve; and, when the cooker lid is engaged with the cooker body, the power transmitting device cooperates with the power receiving device to realize power transmission; when the cooker lid is opened, the power transmitting device is separated from the power receiving device.

In the present solution, the cook body is provided with a power transmitting device, and the cook lid is provided with a power receiving device and a motor driving device. When the cooker lid is engaged with the cooker body, the power transmitting device cooperates with the power receiving device to achieve power transmission between the cooker body and the cooker lid, and achieve electronically controlled venting. When venting, the power transmitting device is connected to the power supply device, and the power supply device transmits the power to the power transmitting device, and the power transmitting device sends the power to the power receiving device, and then the power receiving device transmits power to the driving motor of the motor driving device, so that the driving motor drives the valve cover to move, and open the mechanical vent valve to vent. By means of such design, when venting, a user does not need to manually open the vent valve at close range, thereby preventing the occurrence of the user from being scalded by steam and improving the product safety.

In one embodiment, the driving motor is a DC motor, the power receiving device comprises a first control plate, and the first control plate is electrically connected to the DC motor for transmitting direct current to the DC motor, and controlling the direction of rotation of the DC motor by controlling the direction of the direct current, to open or close the mechanical vent valve.

In the present solution, the open and close of the mechanical vent valve is controlled by the DC motor, and the designed electromagnetic drive device is simple and reliable, and easy to control. When venting, the power transmitting device is connected to the power supply device; the power supply device transmits power to the power transmitting device, and the power transmitting device sends the power to the power receiving device, and the power receiving device transmits the power to the first control plate, and then the first control plate transmits direct current to the DC motor, such that the motor shaft of the DC motor rotates forward to lift the valve cover, thereby opening the mechanical vent valve for venting. After the mechanical vent valve is opened, the first control plate stops supplying power to the DC motor, to stop the rotating of the motor shaft and maintain the valve cover in the current position, leaving the mechanical vent valve in an open state and continuously venting. At the end of venting, the first control plate changes the current direction of the output direct current, to supply power to the DC motor reversely, so that the motor shaft of the DC motor reverses and the valve cover drops and resets, to close the mechanical vent valve.

In one embodiment, the motor driving device further comprises a transmission assembly movably mounted on the cooker lid, and the transmission assembly cooperates with the motor shaft and the valve cover. The driving motor is capable of driving the valve cover to move through the transmission assembly, to open or close the mechanical vent valve.

In the present solution, a transmission assembly is disposed between the driving motor and the mechanical vent valve, which makes the driving motor to have a certain distance from the mechanical vent valve, to prevent the steam spouted from the mechanical vent valve from damaging the driving motor.

In one embodiment, there is a plurality of reset modes of the valve cover. The valve cover is in abutment with the transmission assembly. When the mechanical steam valve need to be closed, the DC motor reversely drives the transmission assembly to reset, and the valve cover is reset by its own gravity, or a reset elastic element is disposed between the valve cover and the valve seat, after the transmission assembly is reset, the valve cover is reset by the reset elastic element; in another embodiment, the valve cover may be connected to the transmission assembly so that the valve cover is reset under the driving of the transmission assembly.

In one embodiment, the transmission assembly comprises: a transmission gear fixedly connected to the motor shaft; a rotating rod, which is rotably connected to the cooker lid by a rotating shaft, a first end of the rotating rod is provided with an arc surface, the rotating shaft is located at the center of the arc surface, the arc surface is provided with a tooth, and the tooth is engaged with the transmission gear, and a second end of the rotating rod cooperates with the valve cover and may drive the valve cover to move.

When venting, the power transmitting device is connected to the power supply device; the power supply device transmits power to the power transmitting device, and the power transmitting device sends the power to the power receiving device, and the power receiving device transmits the power to the first control plate, and then the first control plate transmits direct current to the DC motor, such that the transmission gear mounted on the motor shaft rotates forward with the motor shaft, the rotating rod rotates driven by the transmission gear, so that the second end of the rotating rod lifts the valve cover, thereby opening the mechanical vent valve for venting. After the mechanical vent valve is opened, the first control plate stops supplying power to the DC motor, to stop the rotating of the motor shaft and maintain the rotating rod in the current position, and thus maintain the valve cover in the current position, leaving the mechanical vent valve in an open state and continuously venting. At the end of venting, the first control plate changes the current direction of the output direct current, to supply power to the DC motor reversely, such that the transmission gear rotates reversely with the motor shaft, and the rotating rod is reversed and reset under the driving of the transmission gear, such that the second end of the rotating rod drops, then the valve cover is dropped and reset, to close the mechanical vent valve.

In one embodiment, the transmission assembly comprises: a transmission gear fixedly connected to the motor shaft; a rack, which is slidably mounted on the cooker lid, the first end of the rack is engaged with the transmission gear, and the second end of the rack cooperates with the valve cover and may drive the valve cover to move.

When venting, the power transmitting device is connected to the power supply device; the power supply device transmits power to the power transmitting device, and the power transmitting device sends the power to the power receiving device, and the power receiving device transmits the power to the first control plate, and then the first control plate transmits direct current to the DC motor, such that the transmission gear mounted on the motor shaft rotates forward with the motor shaft, and the rack slides under the driving of the transmission gear, so that the second end of the rack lifts the valve cover, to open the mechanical vent valve for venting. After the mechanical vent valve is opened, the first control plate stops supplying power to the DC motor, to stop the rotating of the motor shaft and maintain the rack in the current position, such that the valve cover is maintained in the current position and the mechanical vent valve is maintained in an open state for continuous venting. At the end of venting, the first control plate changes the current direction of the output direct current, to supply power to the DC motor reversely, so that the transmission gear reverses together with the motor shaft, and the rack is reversely slid and reset under the driving of the transmission gear, and the valve cover is dropped and reset accordingly, to close the mechanical vent valve.

In one embodiment, the rack may slide in a direction perpendicular to the axis of the valve cover, and the second end of the rack is provided with a guide ramp, and the guide ramp is in abutment with the bottom of the valve cover. When the DC motor rotates forward, the rack slides in a direction toward the axis of the valve cover, and the valve cover slides relative to the guide ramp, and then the guide ramp lifts the valve cover to open the mechanical vent valve. When the DC motor rotates reversely, the rack slides in a direction away from the axis of the valve cover, and the valve cover slides relative to the guide ramp, such that the valve cover drops and resets to close the mechanical vent valve.

In one embodiment, the transmission assembly comprising: a transmission gear fixedly connected to the motor shaft; a rack slidably mounted on the cooker lid and being engaged with the transmission gear; a transmission lever whose middle portion is rotably connected to the cooker lid. The both ends of the transmission lever cooperate with the rack and the valve cover respectively, so that the transmission lever is capable of driving the valve cover to move under the driving of the rack.

When venting, the power transmitting device is connected to the power supply device; the power supply device transmits power to the power transmitting device, and the power transmitting device sends the power to the power receiving device, and the power receiving device transmits the power to the first control plate, and then the first control plate transmits direct current to the DC motor, such that the transmission gear mounted on the motor shaft rotates forward with the motor shaft, the rack slides under the driving of the transmission gear to press the first end of the transmission lever, so that the second end of the transmission lever lifts the valve cover, thereby opening the mechanical vent valve for venting. After the mechanical vent valve is opened, the first control plate stops supplying power to the DC motor, to stop the rotating of the motor shaft and maintain the rack and the transmission lever in the current position, such that the valve cover is maintained in the current position and the mechanical vent valve is maintained in an open state for continuous venting. At the end of venting, the first control plate changes the current direction of the output direct current, to supply power to the DC motor reversely, such that the transmission gear rotates reversely with the motor shaft, and the rack is reversely slid and reset by the transmission gear, and the transmission lever is reversed and reset accordingly, such that the second end of the rotating rod drops, then the valve cover is dropped and reset, to close the mechanical vent valve.

In one embodiment, the power transmitting device comprises a first flat coil, the power supply device is configured to transmit alternating current to the first flat coil, and the power receiving device comprises a second flat coil; and, when the cooker lid is engaged with the cooker body, the first flat coil is opposite to the second flat coil.

In the present solution, the first flat coil cooperates with the second flat coil to supply power wirelessly. When the cooker lid is screwed in place, the two flat coils are opposite and close to each other, usually in the range of 0 mm to 50 mm. When venting is necessary, the first flat coil is connected to the power supply device, and the power supply device supplies alternating current to the first flat coil which causes the first flat coil to generate a changing magnetic field, and the second flat coil is induced by the changing magnetic field to generate an induced current, and the induced current is transmitted to the motor driving device, such that the motor driving device opens the mechanical vent valve for venting.

In one embodiment, the power receiving device further comprises a rectifying device, the second flat coil is electrically connected to the first control plate through the rectifying device, and the rectifying device is used to convert the alternating current transmitted by the second flat coil into direct current and then transmit the direct current to the first control plate.

In the present solution, an electromagnetic drive device comprises a DC motor and a first control plate, the first flat coil is affected by the alternating current to generate a changing magnetic field, and the second flat coil is affected by the changing magnetic field to generate AC induced current. To this end, in the present solution, a rectifying device is provided between the first control plate and the second flat coil, and the rectifying device converts the AC induced current into direct current and then supplies it to the first control plate, so that the first control plate may supply the direct current to the DC motor.

In one embodiment, the power transmitting device comprises a first cylindrical coil, the power supply device is configured to supply alternating current to the first cylindrical coil, and the power receiving device comprises a second cylindrical coil, and the inner diameter of the first cylindrical coil is not equal to that of the second cylindrical coil; and, when the cooker lid is engaged with the cooker body, one of the first cylindrical coil and the second cylindrical coil extends into the other.

In the present solution, the first cylindrical coil cooperates with the second cylindrical coil for wireless power supply. The two cylindrical coils have different inner diameters. When the cooker lid is screwed into place, the small cylindrical coil is inserted into the large cylindrical coil, and when venting is necessary, the first cylindrical coil is connected to the power supply device, and the power supply device supplies an alternating current to the cylindrical coil connected thereto, which causes the cylindrical coil to generate a changing magnetic field, and the cylindrical coil connected to the motor driving device is induced by the changing magnetic field to generate an induced current, and the induced current is transmitted to the motor driving device, such that the motor driving device opens the mechanical vent valve for venting.

In one embodiment, the power receiving device further comprises a rectifying device, the second cylindrical coil is electrically connected to the first control plate through the rectifying device, and the rectifying device is used to convert the alternating current transmitted by the second cylindrical coil into direct current and then transmit the direct current to the first control plate.

In the present solution, an electromagnetic drive device comprises a DC motor and a first control plate, the first cylindrical coil is affected by the alternating current to generate a changing magnetic field, and the second cylindrical coil is affected by the changing magnetic field to generate AC induced current. To this end, in the present solution, a rectifying device is provided between the first control plate and the second cylindrical coil, and the rectifying device converts the AC induced current into direct current and then supplies it to the first control plate, so that the first control plate may supply the direct current to the DC motor.

In one embodiment, one of the power transmitting device and the power receiving device comprises a power socket, and the other comprises a power plug, and when the cooker lid is engaged with the cooker body, the power plug cooperates with the power socket.

In the present solution, a power socket and a power plug are respectively disposed on the cooker body and the cooker lid. After the cooker lid is screwed into place, the power plug cooperates with the power socket to achieve electric connection, thereby realizing current and electric signal transmission between the cooker body and the cooker lid.

In one embodiment, the power receiving device further comprises a rectifying device, and the power socket or the power plug in the power receiving device is electrically connected to the DC motor through the rectifying device. The rectifying device is configured to convert alternating current transmitted by the power socket or the power plug into direct current and transmit the direct current to the first control plate; or, the power transmitting device further comprises a rectifying device, and the power socket or the power plug in the power transmitting device is connected to the power supply device through the rectifying device, and the rectifying device is configured to convert alternating current transmitted by the power supply device into direct current, and transmit the direct current to the power socket or the power plug connected thereto.

In the present solution, an electromagnetic drive device comprises a DC motor and a first control plate, and the power supply device transmits an alternating current. For this purpose, in the present solution, a rectifying device is provided between the power supply device and the first control plate. In one embodiment, the rectifying device may be connected to the power supply device, or may be connected to the first control plate, and the rectifying device converts the alternating current into direct current for use by the DC motor.

In one embodiment, the split-type electric pressure cooker further comprises a venting switch and a controller mounted on the cooker body. The controller is electrically connected with the power supply device, the venting switch and the power transmitting device, and the venting switch is configured to send a trigger signal to the controller, so that the controller transmits power to the power transmitting device according to the trigger signal.

When venting, users trigger the venting switch, such that the venting switch sends a trigger signal for starting venting to the controller, to trigger the internal corresponding program of the controller, and the controller transmits a current and valve-opening electric signal to the power transmitting device, and then the power transmitting device and the power receiving device transmit the current and valve-opening electric signal to the first control plate. After receiving the valve-opening electric signal, the first control plate transmits a direct current to the DC motor, such that the transmission gear mounted on the motor shaft rotates forwardly with the motor shaft, and the transmission assembly lifts the valve cover, thereby opening the mechanical vent valve for venting. The DC motor is rotated forwardly to open the mechanical vent valve, and the controller or the first control plate stops the power supply after the first control plate is powered by the DC motor for a preset period according to its preset procedure, so that the DC motor is powered off and stopped to rotate, to maintain the transmission assembly in the current position and thus maintain the valve cover in the current position, and maintain the mechanical vent valve in an open state for continuous venting. At the end of venting, a user sends a trigger signal of ending venting to the controller through the venting switch to trigger a corresponding internal control program, so that the controller transmits a current and valve-closing signal to the power transmitting device, and the power transmitting device and the power receiving device transmit the current and valve-closing signal to the first control plate. After receiving the valve-opening electric signal, the first control plate supplies power to the DC motor reversely, so that the DC motor reverses and the transmission gear reversely rotates with the motor shaft, and the transmission assembly is reset. Then the valve cover is dropped and reset to close the mechanical vent valve, and the controller or the first control plate stops the power supply after the first control plate is reversely powered by the DC motor for a preset period of time according to its preset procedure, so that the DC motor is powered off and stopped to rotate, to maintain the transmission assembly in the current position and thus maintain the valve cover in the current position, and maintain the mechanical vent valve in a closed state.

In one embodiment, the venting switch is mounted on the cooker body away from the mechanical vent valve to ensure that user's hands are kept away from the mechanical vent valve when a user pushes the venting switch, thereby preventing the user from being scalded by the discharged steam.

In one embodiment, the controller or the first control plate is further configured to control a position of the valve cover by controlling the power supply duration of the DC motor, so as to control an opening degree of the mechanical vent valve.

In one embodiment, the venting switch has a plurality of venting gear positions available. When a user selects different venting gear positions, the venting switch sends different trigger signals to the controller. Different trigger signals trigger different programs of the controller, to control the duration of the power supply by the controller to the first control plate, or allow the controller to transmit different valve-opening signals to the first control plate, thereby controlling the power supply duration of the first control plate to the DC motor, to control the lifting height of the DC motor to the valve cover, that is, the opening degree of the mechanical vent valve, so as to adjust the venting velocity of the product.

In one embodiment, the power transmitting device further comprises a second control plate, and the second control plate is disposed adjacent to the first flat coil or the first cylindrical coil in the power transmitting device, and the second control plate is electrically connected to the first flat coil or the first cylindrical coil and the controller.

When a coil wireless power supply transmission mode is employed between the cooker body and the cooker lid, if the power supply distance between the power supply device and the coil of the power transmitting device is far, the current transmission between the power supply device and the coil has poor effect, which leads to a poor effect of induced magnetic field produced by the coil, and the poor effect directly causes a weak induced current generated from the coils in the power receiving device, which cannot meet the design standard. The driving motor works, finally the venting effect of the product is not ideal. In order to solve the foregoing problem, in the present solution, a second control plate is added in the power transmitting device, and the second control plate is connected to the power supply device and is mounted close to the coil in the power transmitting device. When venting, the power supply device is connected to the second control plate to supply power to the second control plate. The second control plate supplies current to the coil in the power transmitting device, thereby shortening the power supply distance to the coil and improving the current transmission effect.

Additional aspects and advantages of the present disclosure will become apparent in the following description, or can be understood in the practice of the present disclosure.

BRIEF DESCRIPTION OF THE DRAWINGS

The above-mentioned and/or additional aspects and advantages of the present disclosure will become more apparent and more easily to understand in the description of embodiments with reference to the accompanying drawings. Among the drawings.

In one embodiment, the correspondence between the reference numerals and the part names in FIG. 1 to FIG. 12 is as follows:

1 cooker body, 11 control panel, 12 power transmitting device, 120 transmitting device mounting portion, 121 first flat coil, 122 second PCB control panel, 123 transmitting device mounting seat, 2 cooker lid, 21 mechanical vent valve, 211 valve seat, 212 valve cover, 22 power receiving device, 220 receiving device mounting portion, 221 second flat coil, 222 first PCB control panel, 223 receiving device mounting seat, 23 motor driving device, 230 rotating shaft, 231 DC motor, 232 transmission gear, 233 rotating rod, 234 rack, 235 transmission lever.

DETAILED DESCRIPTION

In order to understand the foregoing objects, features and advantages herein more clearly, the present disclosure will be further described in detail below with reference to the drawings and specific embodiments. It should be noted that the embodiments and the features in the embodiments can be combined provided that there is no confliction among them.

In the following description, numerous specific details are set forth in order to provide a thorough understanding of the disclosure, however, the disclosure may be practiced otherwise than as described herein. Therefore, the scope of protection of the present disclosure will be not limited by the following disclosed specific embodiments.

The present disclosure provides a split-type electric pressure cooker, comprising a cooker body and a cooker lid cooperating with the cooker body, the cooker body being provided with a power supply device. The split-type electric pressure cooker further comprises: a mechanical vent valve, comprising a valve seat and a valve cover, and the valve seat is fixedly mounted on the cooker lid, and the valve cover may be movably mounted on the valve seat; a power transmitting device mounted on the cooker body and able to be electrically connected to the power supply device, and the power transmitting device is used to transmit power to the power receiving device; a power receiving device mounted on the cooker lid; and a motor driving device, comprising a driving motor mounted on the cooker lid and electrically connected to the power receiving device, and the motor shaft of the driving motor may drive the valve cover to move so as to open or close the mechanical vent valve; and, when the cooker lid is engaged with the cooker body, the power transmitting device cooperates with the power receiving device to realize power transmission; when the cooker lid is opened, the power transmitting device is separated from the power receiving device.

In the present solution, the cook body is provided with a power transmitting device, and the cook lid is provided with a power receiving device and a motor driving device. When the cooker lid is engaged with the cooker body, the power transmitting device cooperates with the power receiving device to achieve power transmission between the cooker body and the cooker lid, and achieve electronically controlled venting. When venting, the power transmitting device is connected to the power supply device, and the power supply device transmits the power to the power transmitting device, and the power transmitting device sends the power to the power receiving device, and then the power receiving device transmits power to the driving motor of the motor driving device, so that the driving motor drives the valve cover to move, and open the mechanical vent valve to vent. By means of such design, when venting, a user does not need to manually open the vent valve at close range, thereby preventing the occurrence of the user from being scalded by steam and improving the product safety.

Embodiment 1

Referring to FIG. 1 to FIG. 8, the split-type electric pressure cooker comprises a cooker body 1, a cooker lid 2, a mechanical vent valve 21, a motor driving device 23, a power transmitting device 12, and a power receiving device 22. A control panel 11 is mounted in front of the cooker body 1, and a main control panel (i.e. controller) is mounted in the control panel 11, the control panel 11 is provided with a venting switch, the main control panel is electrically connected to the venting switch and the power supply device of the split-type electric pressure cooker. The mechanical vent valve 21 comprises a valve seat 211 and a valve cover 212. The valve seat 211 is fixedly mounted on the cooker lid 2, and the valve cover 212 is movably mounted on the valve seat 211. The motor driving device 23 comprises a DC motor 231, a transmission gear 232 and a rotating rod 233. The transmission gear 232 is fixedly connected to the motor shaft, and the rotating rod 233 is rotatably connected to the cooker lid 2 through a rotating shaft 230. The first end of the rotating rod 233 is provided with an arc surface, and the rotating shaft 230 is positioned in the center of the arc surface, the arc surface is provided with teeth, the teeth are engaged with the transmission gear 232, and the second end of the rotating rod 233 is in abutment with the bottom of the valve cover 212. The power transmitting device 12 comprises a first flat coil 121, a second PCB control panel 122, and a transmitting device mounting seat 123. The first flat coil 121 and the second PCB control panel 122 are fixedly mounted on the transmitting device mounting seat 123, and the cooker body 1 is provided with a transmitting device mounting portion 120, and the transmitting device mounting seat 123 is fixedly mounted in the transmitting device mounting portion 120, the first PCB control panel 222 is electrically connected to the main control panel and the first flat coil 121 for supplying an alternating current to the first flat coil 121 under the control of the main control panel, and the first PCB control panel 222 is disposed adjacent to the first flat coil 121, to shorten the power supply distance to the first flat coil 121 and improve the current transmission effect. The power receiving device 22 comprises a second flat coil 221, a first PCB control panel 222 having a rectifying circuit, and a receiving device mounting seat 223, the second flat coil 221 and the second PCB control panel 122 are fixedly mounted on the receiving device mounting seat 223, and a receiving device mounting portion 220 is disposed on the cooker lid 2, the receiving device mounting seat 223 is fixedly mounted in the receiving device mounting portion 220, and the second flat coil 221 is electrically connected to the electromagnetic coil of the push-pull electromagnet 3 through the second PCB control panel 122.

Figure 1:
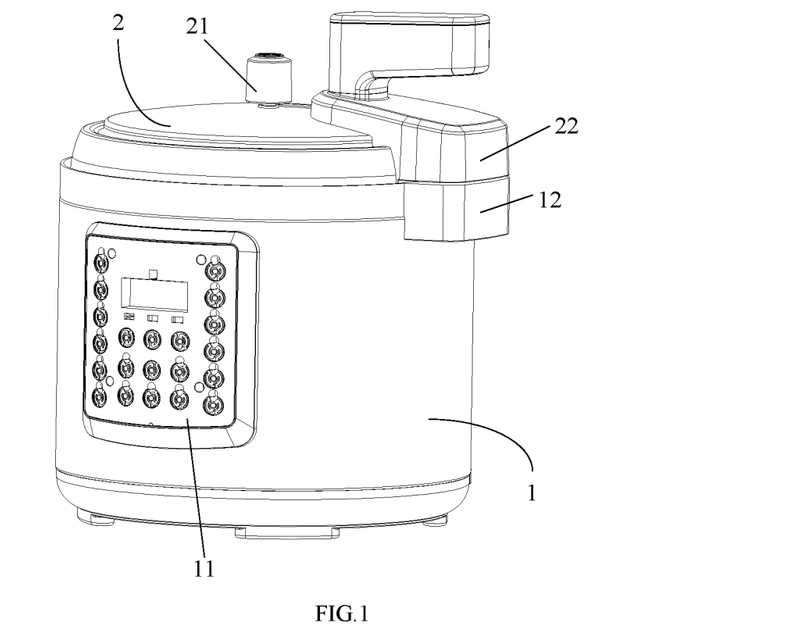
FIG. 1 is a schematic structural diagram of a split-type electric pressure cooker in a first embodiment of the present disclosure.
Figure 2:
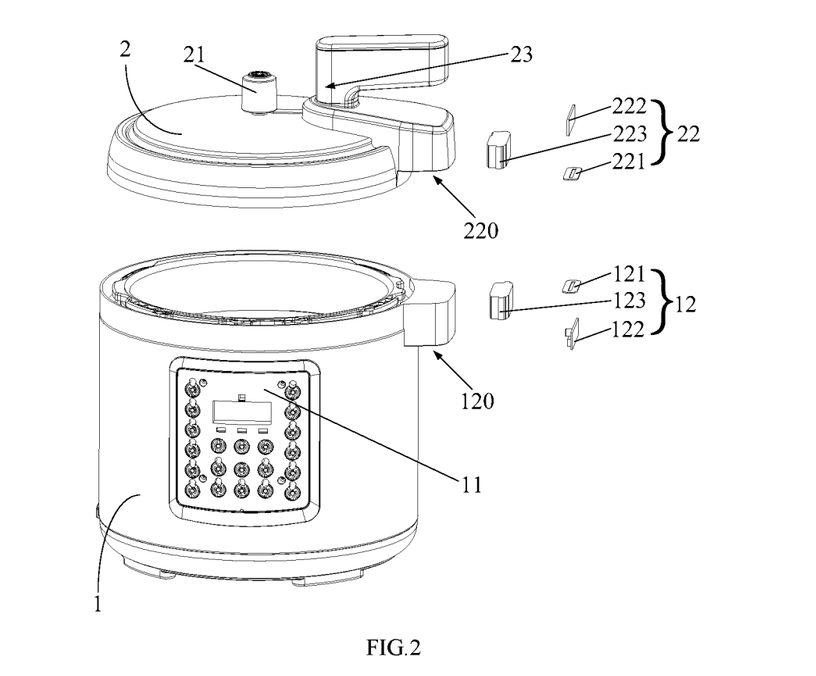
FIG. 2 is a schematic structural diagram of an assembled split-type electric pressure cooker shown in FIG. 1.
Figure 3:
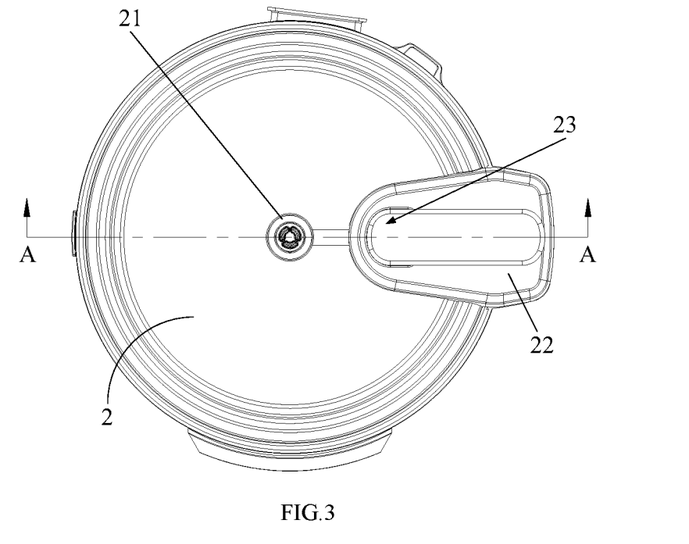
FIG. 3 is a schematic structural diagram of a split-type electric pressure cooker shown in FIG. 1 from another angle.
Figure 4:
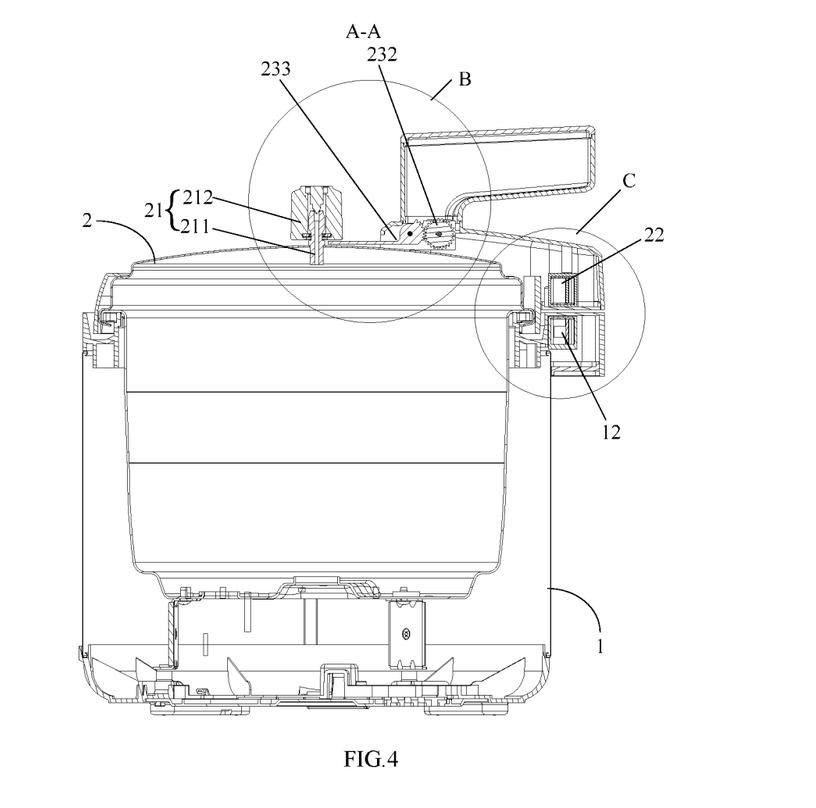
FIG. 4 is a schematic cross-sectional structural diagram of a split-type electric pressure cooker in A-A direction shown in FIG. 3.
Figure 5:
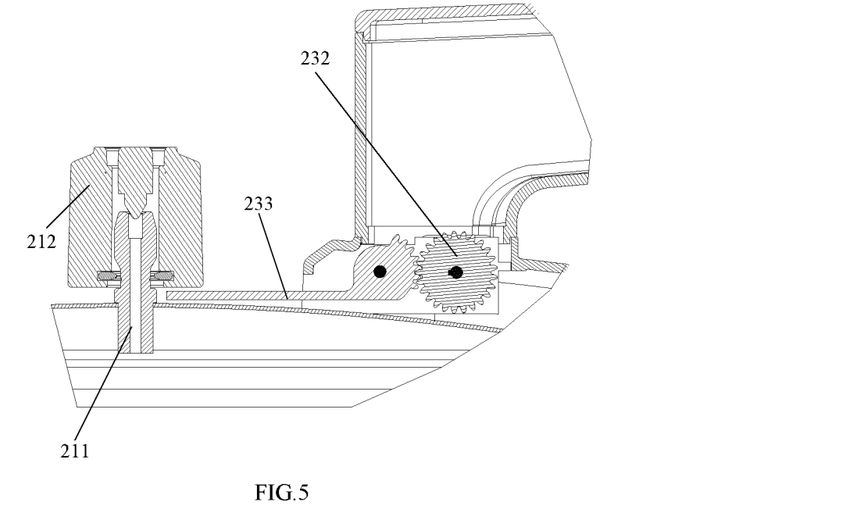
FIG. 5 is an enlarged schematic structural diagram of a B portion shown in FIG. 4.
Figure 6:
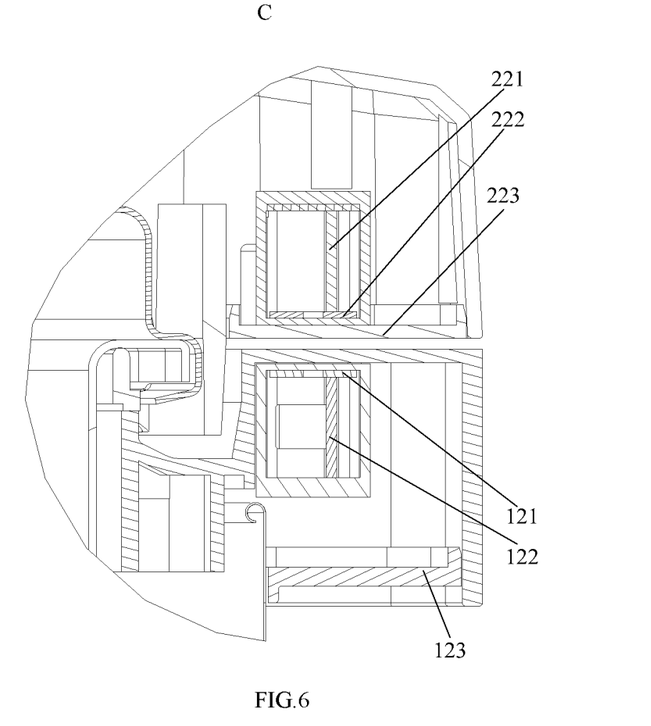
FIG. 6 is an enlarged schematic structural diagram of a C portion shown in FIG. 4.
Figure 7:
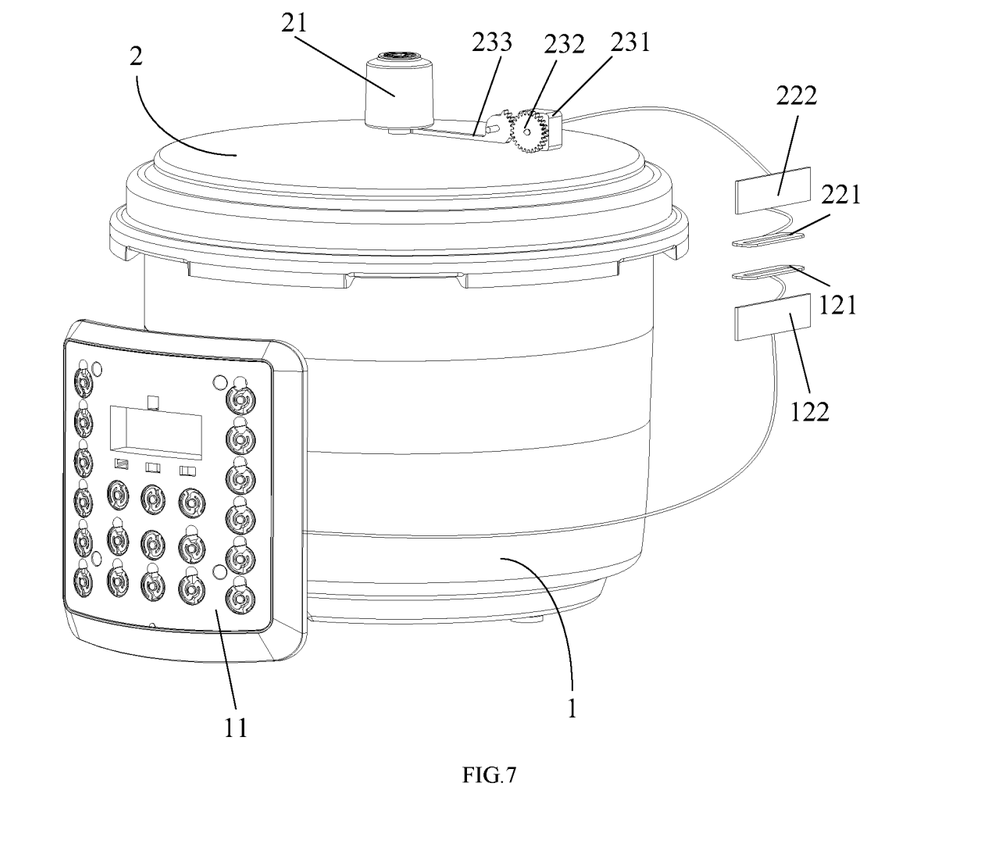
FIG. 7 is a schematic diagram of the working principle of a split-type electric pressure cooker shown in FIG. 1.
Figure 8:
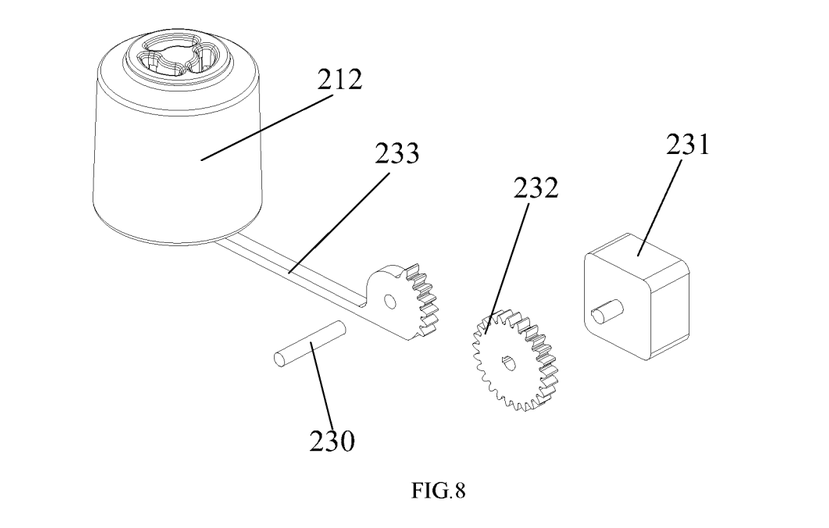
FIG. 8 is a schematic structural diagram of the assembly of a motor driving device and a valve cover shown in FIG. 7.

In the present solution, the first flat coil 121 cooperates with the second flat coil 221 to achieve wireless power supply. After the cooker lid 2 is screwed into place, the two flat coils are opposite to each other, and the distance between the two flat coils is relatively short, usually in the range of 0 mm to 50 mm. When venting, users trigger the venting switch, such that the venting switch sends a trigger signal for starting venting to the main control panel, to trigger the internal corresponding program of the main control panel, and the main control panel controls the second PCB control panel 122 to transmit alternating current and valve-opening signal to the first flat coil 121, the changing current makes the first flat coil 121 to generate a changing magnetic field, and the second flat coil 221 generates an alternating induced current affected by the changing magnetic field. The first PCB control panel 222 receives the alternating current for alignment and processing, so that the first PCB control panel 222 transmits direct current to the DC motor 231 according to a preset procedure, and the transmission gear 232 mounted on the motor shaft rotates forward with the motor shaft, and the rotating rod 233 rotates under the driving of the transmission gear 232, such that the second end of the rotating rod 233 lifts the valve cover 212, thereby opening the mechanical vent valve 21 for venting. In addition, the main control panel or the first control plate stops the power supply after the first control plate supplies power to the DC motor 231 for a preset period of time according to its own preset procedure, so that the DC motor 231 is powered off and stopped rotating, to maintain the rotating rod 233 in the current position and thus maintain the valve cover 212 in the current position, and maintain the mechanical vent valve 21 in an open state for continuous venting. At the end of venting, a user sends a trigger signal of finishing venting to the main control panel through the venting switch, to trigger a corresponding internal control program, so that the main control panel controls the second PCB control panel 122 to transmit current and valve-closing signals to the first flat coil 121, the changing current makes the first flat coil 121 to generate a changing magnetic field, and the second flat coil 221 generates an alternating induced current affected by the changing magnetic field. The first PCB control panel 222 receives the alternating current for alignment and processing, so that the first PCB control panel 222 supplies power to the DC motor 231 reversely according to the preset procedure, and the transmission gear 232 rotates reversely with the motor shaft, and the rotating rod 233 rotates reversely and resets under the driving of the transmission gear 232, such that the second end of the rotating rod 233 drops and the valve cover 212 drops and resets accordingly to close the mechanical vent valve 21. In addition, the main control panel or the first control plate stops the power supply after the first control plate supplies power to the DC motor 231 reversely for a preset period of time according to its own preset procedure, so that the DC motor 231 is powered off and stopped rotating, to maintain the rack 234 and the rotating rod 233 in the current position and maintain the valve cover 212 in the current position, and to maintain the mechanical vent valve 21 in a closed state. In one embodiment, the venting switch is mounted on the cooker body 1 away from the mechanical vent valve 21 to ensure that user's hands are kept away from the mechanical vent valve 21 when a user pushes the venting switch, thereby preventing the user from being scalded by the discharged steam.

In one embodiment, the first flat coil 121 may be a coil made of copper wire, or a coil etched directly on the first PCB control panel 222. Similarly, the second flat coil 221 may be a coil made of copper wire, or a coil etched directly on the second PCB control panel 122.

In the foregoing embodiment, the lifting height of the valve cover 212 by the rotating rod 233 is controlled by the rotation angle of the rotating rod 233. Therefore, the venting switch has a plurality of venting gear positions, and when the user selects different venting gear positions, the venting switch sends different trigger signal to the main control panel, and different trigger signals trigger different programs of the main control panel to control the power supply duration of the main control panel to the first PCB control panel 222, or allow the main control panel to transmit different valve-opening signals to the first PCB control panel 222, thereby controlling the power supply duration of the first PCB control panel 222 to the DC motor 231, to control the rotation angle of the rotating rod 233 and control the lifting height of the valve cover 212 by the rotating rod 233, that is, the opening degree of the mechanical vent valve 21, so as to adjust the venting velocity of the product.

On the basis of this, in the present embodiment, the wireless power supply transmission mode by cooperation of the first flat coil 121 with the second flat coil 221 may be replaced with the wireless power supply transmission mode by cooperation of the first cylindrical coil and the second cylindrical coil. One embodiment is as follows: the first cylindrical coil is electrically connected to the second PCB control panel 122, and the second cylindrical coil is electrically connected to the first PCB control panel 222. The inner diameters of the two cylindrical coils are different. After the cooker lid 2 is screwed into place, the small cylindrical coil is inserted into the large cylindrical coil to achieve the transmission of current and electrical signals through an electromagnetic induction way.

In the present embodiment, the wireless power supply transmission mode by cooperation of the first flat coil 121 with the second flat coil 221 may be replaced with the insertion transmission mode by cooperation of the power plug and the power socket. In the present solution, the transmission of current and electrical signals is realized by electrical connection of the power plug and power socket, rather than an electromagnetic induction way. Therefore, it is not necessary to consider the effect of the power supply distance on the induced magnetic field strength, and the second PCB control panel 122 may be omitted. The particular solution is as follows: one of the power transmitting device 12 and the power receiving device 22 comprises a power socket, and the other comprises a power plug, the power socket and the power plug are electrically connected to the main control panel and the first PCB control panel 222 respectively, when the cooker lid 2 is engaged with the cooker body 1, the insertion of the power plug and the power socket achieves electrical connection, thus achieving the transmission of the current and electrical signals.

Embodiment 2

Figure 9:
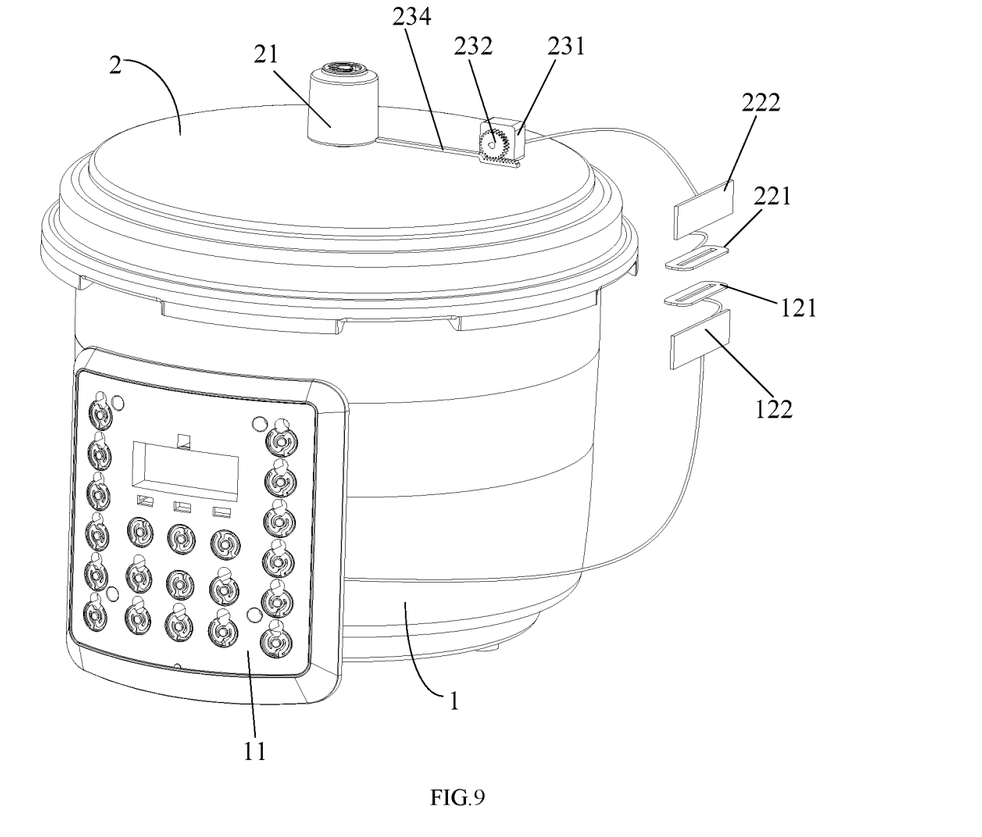
FIG. 9 is a schematic diagram showing the working principle of a split-type electric pressure cooker provided by a second embodiment of the present disclosure.
Figure 10:
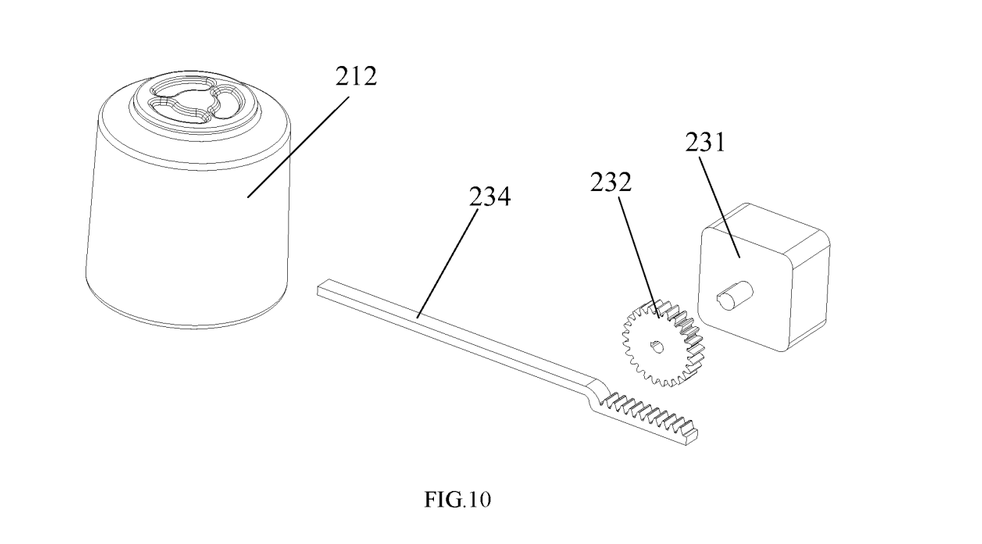
FIG. 10 is a schematic structural diagram of the assembly of a motor driving device and a valve cover shown in FIG. 9.

Referring to FIG. 9 and FIG. 10, the split-type electric pressure cooker comprises a cooker body 1, a cooker lid 2, a mechanical vent valve 21, a motor driving device 23, a power transmitting device 12, and a power receiving device 22. A control panel is mounted in front of the cooker body 1, and a main control panel (i.e. controller) is mounted in the control panel 11, the control panel 11 is provided with a venting switch, the main control panel is electrically connected to the venting switch and the power supply device of the split-type electric pressure cooker. The mechanical vent valve 21 comprises a valve seat and a valve cover 212. The valve seat is fixedly mounted on the cooker lid 2, and the valve cover 212 is movably mounted on the valve seat. The motor driving device 23 comprises a DC motor 231, a transmission gear 232 and a rack 234. The transmission gear 232 is fixedly connected to the motor shaft, the rack 234 is slidably mounted on the cooker lid 2, the first end of the rack 234 is engaged with the transmission gear 232, and the second end of the rack 234 is inserted between the valve cover 212 and the valve seat, to lift the valve cover 212, thereby opening the mechanical vent valve 21. The power transmitting device 12 comprises a first flat coil 121, a second PCB control panel 122, and a transmitting device mounting seat. The first flat coil 121 and the second PCB control panel 122 are fixedly mounted on the transmitting device mounting seat, and the cooker body 1 is provided with a transmitting device mounting portion, and the transmitting device mounting seat is fixedly mounted in the transmitting device mounting portion, the first PCB control panel 222 is electrically connected to the main control panel and the first flat coil 121 for supplying an alternating current to the first flat coil 121 under the control of the main control panel, and the first PCB control panel 222 is disposed adjacent to the first flat coil 121, to shorten the power supply distance to the first flat coil 121 and improve the current transmission effect. The power receiving device 22 comprises a second flat coil 221, a first PCB control panel 222 having a rectifying circuit, and a receiving device mounting seat, the second flat coil 221 and the second PCB control panel 122 are fixedly mounted on the receiving device mounting seat, and a receiving device mounting portion is disposed on the cooker lid 2, the receiving device mounting seat is fixedly mounted in the receiving device mounting portion, and the second flat coil 221 is electrically connected to the electromagnetic coil of the push-pull electromagnet 3 through the second PCB control panel 122.

In the present solution, the first flat coil 121 cooperates with the second flat coil 221 to achieve wireless power supply. After the cooker lid 2 is screwed into place, the two flat coils are opposite to each other, and the distance between the two flat coils is relatively short, usually in the range of 0 mm to 50 mm. When venting, users trigger the venting switch, such that the venting switch sends a trigger signal for starting venting to the main control panel, to trigger the internal corresponding program of the main control panel, and the main control panel controls the second PCB control panel 122 to transmit alternating current and valve-opening signal to the first flat coil 121, the changing current makes the first flat coil 121 to generate a changing magnetic field, and the second flat coil 221 generates an alternating induced current affected by the changing magnetic field. The first PCB control panel 222 receives the alternating current for alignment and processing, so that the first PCB control panel 222 transmits direct current to the DC motor 231 according to a preset program, and the transmission gear 232 mounted on the motor shaft rotates forward with the motor shaft, and the rack 234 slides towards the direction of the axis of the valve cover 212 under the driving of the transmission gear 232, such that the second end of the rack 234 is inserted between the valve cover 212 and the valve seat, to lift the valve cover 212, thereby opening the mechanical vent valve 21 for venting. In addition, the main control panel or the first control plate stops the power supply after the first control plate supplies power to the DC motor 231 for a preset period of time according to its own preset procedure, so that the DC motor 231 is powered off and stopped rotating, to maintain the rotating rod 233 in the current position and thus maintain the valve cover 212 in the current position, and maintain the mechanical vent valve 21 in an open state for continuous venting. At the end of venting, a user sends a trigger signal of finishing venting to the main control panel through the venting switch, to trigger a corresponding internal control program, so that the main control panel controls the second PCB control panel 122 to transmit current and valve-closing signals to the first flat coil 121, the changing current makes the first flat coil 121 to generate a changing magnetic field, and the second flat coil 221 generates an alternating induced current affected by the changing magnetic field. The first PCB control panel 222 receives the alternating current for alignment and processing, so that the first PCB control panel 222 supplies power to the DC motor 231 reversely according to the preset program, and the transmission gear 232 rotates reversely with the motor shaft, and the rack 234 slides in a direction away from the axis of the valve cover 212 under the driving of the transmission gear 232, such that the second end of the rack 234 is withdrawn between the valve cover 212 and the valve seat, and the valve cover 212 drops and resets accordingly to close the mechanical vent valve 21. In addition, the main control panel or the first control plate stops the power supply after the first control plate supplies power to the DC motor 231 reversely for a preset period of time according to its own preset program, so that the DC motor 231 is powered off and stopped rotating, to control the position of the rack 234. In one embodiment, the venting switch is mounted on the cooker body 1 away from the mechanical vent valve 21 to ensure that user's hands are kept away from the mechanical vent valve 21 when a user pushes the venting switch, thereby preventing the user from being scalded by the discharged steam.

In one embodiment, the first flat coil 121 may be a coil made of copper wire, or a coil etched directly on the first PCB control panel 222. Similarly, the second flat coil 221 may be a coil made of copper wire, or a coil etched directly on the second PCB control panel 122.

In the foregoing embodiment, the second end of the rack 234 is provided with a guide ramp, and the guide ramp is in abutment with the bottom of the valve cover 212. The height of the valve cover 212 lifted by the guide ramp is controlled by a slide distance of the rack 234. The venting switch has a plurality of venting gear positions, and when the user selects different venting gear positions, the venting switch sends different trigger signals to the main control panel, and different trigger signals trigger different programs of the main control panel to control the power supply duration of the main control panel to the first PCB control panel 222, or allow the main control panel to transmit different valve-opening signals to the first PCB control panel 222, thereby controlling the power supply duration of the first PCB control panel 222 to the DC motor 231, to control the slide distance of the rack 234 and thus control the lifting height of the valve cover 212 by the guide ramp of the rack 234, that is, the opening degree of the mechanical vent valve 21, so as to adjust the venting velocity of the product.

On the basis of this, in the present embodiment, the wireless power supply transmission mode by cooperation of the first flat coil 121 with the second flat coil 221 may be replaced with the wireless power supply transmission mode by cooperation of the first cylindrical coil and the second cylindrical coil. One embodiment is as follows: the first cylindrical coil is electrically connected to the second PCB control panel 122, and the second cylindrical coil is electrically connected to the first PCB control panel 222. The inner diameters of the two cylindrical coils are different. After the cooker lid 2 is screwed into place, the small cylindrical coil is inserted into the large cylindrical coil to achieve the transmission of current and electrical signals through an electromagnetic induction way.

In the present embodiment, the wireless power supply transmission mode by cooperation of the first flat coil 121 with the second flat coil 221 may be replaced with the insertion transmission mode by cooperation of the power plug and the power socket. In the present solution, the transmission of current and electrical signals is realized by electrical connection of the power plug and power socket, rather than an electromagnetic induction way. Therefore, it is not necessary to consider the effect of the power supply distance on the induced magnetic field strength, and the second PCB control panel 122 may be omitted. The particular solution is as follows: one of the power transmitting device 12 and the power receiving device 22 comprises a power socket, and the other comprises a power plug, and the power socket and the power plug are electrically connected to the main control panel and the first PCB control panel 222 respectively, when the cooker lid 2 is engaged with the cooker body 1, the insertion of the power plug and the power socket achieves electrical connection, thus achieving the transmission of the current and electrical signals.

Embodiment 3

Figure 11:
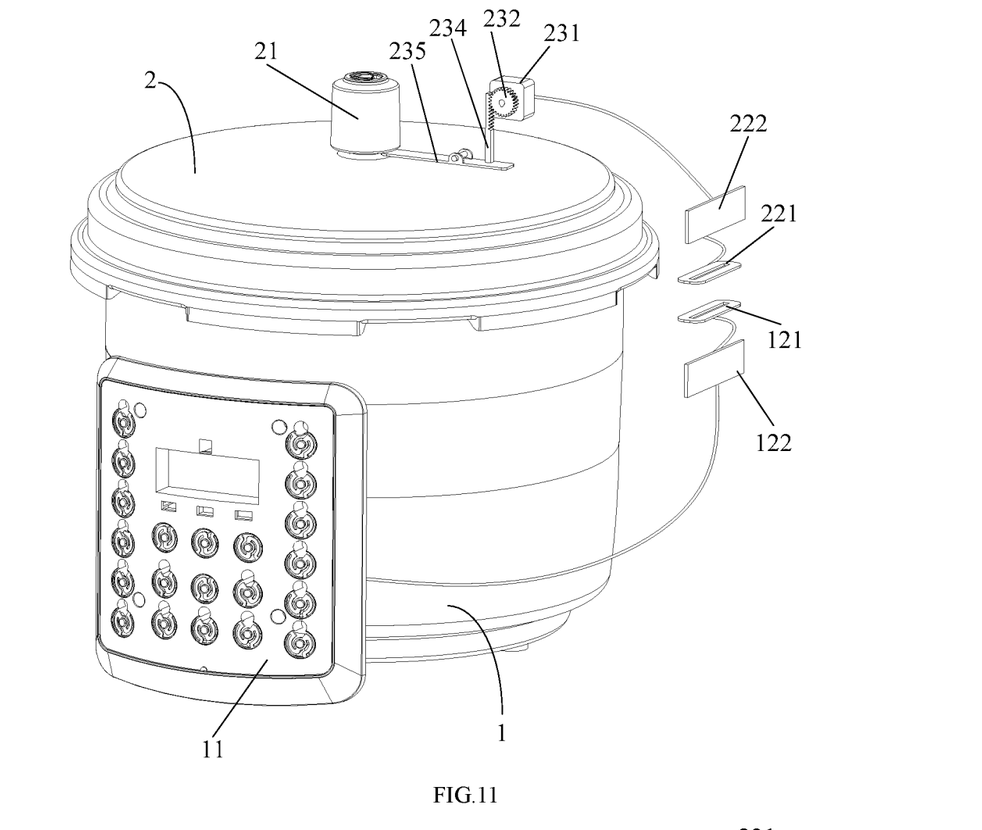
FIG. 11 is a schematic diagram showing the working principle of a split-type electric pressure cooker provided by a third embodiment of the present disclosure.
Figure 12:
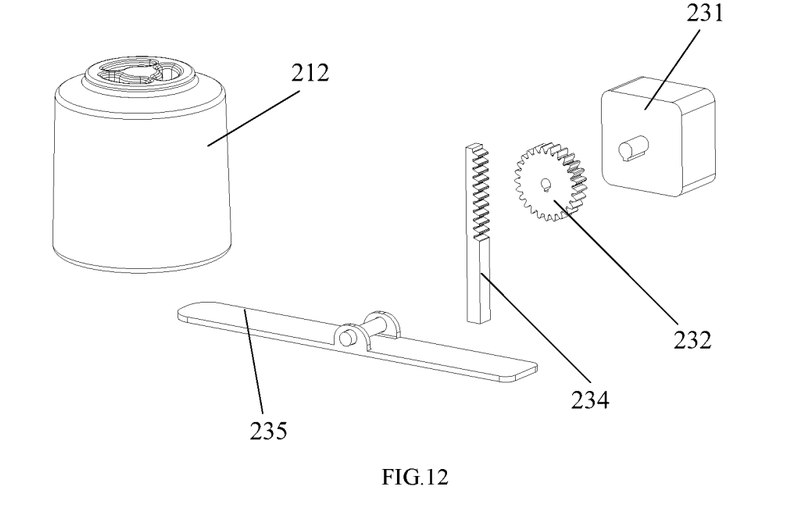
FIG. 12 is a schematic structural diagram of the assembly of a motor driving device and a valve body shown in FIG. 11.
Figure 13:
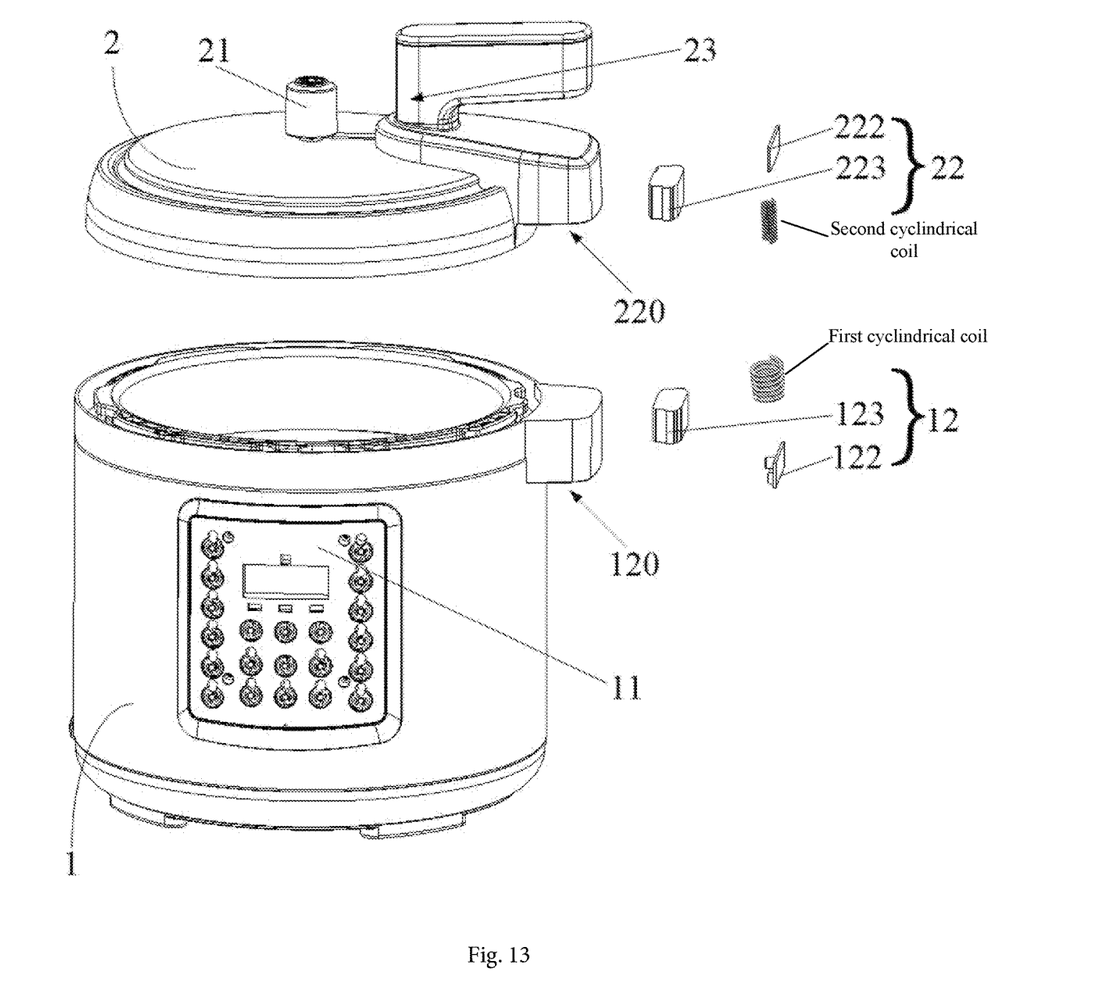
FIG. 13 is a schematic structural diagram of an assembled split-type electrical pressure cooker shown in FIG. 1.

Referring to FIG. 11 and FIG. 12, the split-type electric pressure cooker comprises a cooker body 1, a cooker lid 2, a mechanical vent valve 21, a motor driving device 23, a power transmitting device 12, and a power receiving device 22. A control panel 11 is mounted in front of the cooker body 1, and a main control panel (i.e. controller) is mounted in the control panel 11, the control panel 11 is provided with a venting switch, the main control panel is electrically connected to the venting switch and the power supply device of the split-type electric pressure cooker. The mechanical vent valve 21 comprises a valve seat and a valve cover 212. The valve seat is fixedly mounted on the cooker lid 2, and the valve cover 212 is movably mounted on the valve seat. The motor driving device 23 comprises a DC motor 231, a transmission gear 232, a rack 234 and a transmission lever 235. The transmission gear 232 is fixedly connected to the motor shaft, the rack 234 is slidably mounted on the cooker lid 2 and is engaged with the transmission gear 232; the middle portion of the transmission lever 235 is rotatably connected to the cooker lid 2, the top portion of the first end of the transmission lever 235 may be in abutment with the bottom of the rack 234, and the top portion of the second end of the transmission lever 235 may be in abutment with the bottom of the valve cover 212, so that the transmission lever 235 may drive the valve cover 212 to move under the push of the rack 234. The power transmitting device 12 comprises a first flat coil 121, a second PCB control panel 122, and a transmitting device mounting seat. The first flat coil 121 and the second PCB control panel 122 are fixedly mounted on the transmitting device mounting seat, and the cooker body 1 is provided with a transmitting device mounting portion, and the transmitting device mounting seat is fixedly mounted in the transmitting device mounting portion, the first PCB control panel 222 is electrically connected to the main control panel and the first flat coil 121 for supplying an alternating current to the first flat coil 121 under the control of the main control panel, and the first PCB control panel 222 is disposed adjacent to the first flat coil 121, to shorten the power supply distance to the first flat coil 121 and improve the current transmission effect. The power receiving device 22 comprises a second flat coil 221, a first PCB control panel 222 having a rectifying circuit, and a receiving device mounting seat, the second flat coil 221 and the second PCB control panel 122 are fixedly mounted on the receiving device mounting seat, and a receiving device mounting portion is disposed on the cooker lid 2, the receiving device mounting seat is fixedly mounted in the receiving device mounting portion, and the second flat coil 221 is electrically connected to the electromagnetic coil of the push-pull electromagnet 3 through the second PCB control panel 122.

In the present solution, the first flat coil 121 cooperates with the second flat coil 221 to achieve wireless power supply. After the cooker lid 2 is screwed into place, the two flat coils are opposite to each other, and the distance between the two flat coils is relatively short, usually in the range of 0 mm to 50 mm. When venting, users trigger the venting switch, such that the venting switch sends a trigger signal for starting venting to the main control panel, to trigger the internal corresponding program of the main control panel, and the main control panel controls the second PCB control panel 122 to transmit alternating current and valve-opening signal to the first flat coil 121, the changing current makes the first flat coil 121 to generate a changing magnetic field, and the second flat coil 221 generates an alternating induced current affected by the changing magnetic field. The first PCB control panel 222 receives the alternating current for alignment and processing, so that the first PCB control panel 222 transmits direct current to the DC motor 231 according to a preset program, and the transmission gear 232 mounted on the motor shaft rotates forward with the motor shaft, and the rack 234 slides downwardly under the driving of the transmission gear 232, by pressing down the first end of the transmission lever 235, the second end of the transmission lever 235 warps up to lift the valve cover 212, thereby opening the mechanical vent valve 21 for venting. In addition, the main control panel or the first control plate stops the power supply after the first control plate supplies power to the DC motor 231 for a preset period of time according to its own preset program, so that the DC motor 231 is powered off and stopped rotating, to maintain the rotating rod 233 in the current position and thus maintain the valve cover 212 in the current position, and maintain the mechanical vent valve 21 in an open state for continuous venting. At the end of venting, a user sends a trigger signal of finishing venting to the main control panel through the venting switch, to trigger a corresponding internal control program, so that the main control panel controls the second PCB control panel 122 to transmit current and valve-closing signals to the first flat coil 121, the changing current makes the first flat coil 121 to generate a changing magnetic field, and the second flat coil 221 generates an alternating induced current affected by the changing magnetic field. The first PCB control panel 222 receives the alternating current for alignment and processing, so that the first PCB control panel 222 supplies power to the DC motor 231 reversely according to the preset program, and the transmission gear 232 rotates reversely with the motor shaft, and the rack 234 slides upwardly under the driving of the transmission gear 232, the transmission lever 235 is reversed and reset under its own gravity, such that the second end of the transmission lever 235 drops and the valve cover 212 then falls back and resets under its own gravity to close the mechanical vent valve 21. In addition, the main control panel or the first control plate stops the power supply after the first control plate supplies power to the DC motor 231 reversely for a preset period of time according to its own preset program, so that the DC motor 231 is powered off and stopped rotating, to control the position of the rack 234. In one embodiment, the venting switch is mounted on the cooker body 1 away from the mechanical vent valve 21 to ensure that user's hands are kept away from the mechanical vent valve 21 when a user pushes the venting switch, thereby preventing the user from being scalded by the discharged steam.

In one embodiment, the first flat coil 121 may be a coil made of copper wire, or a coil etched directly on the first PCB control panel 222. Similarly, the second flat coil 221 may be a coil made of copper wire or a coil etched directly on the second PCB control panel 122.

In the foregoing embodiment, the lifting height of the valve cover 212 by the transmission lever 235 is controlled by a distance pressed down on the transmission lever 235 by the rack 234. Therefore, the venting switch has a plurality of venting gear positions, and when the user selects different venting gear positions, the venting switch sends different trigger signal to the main control panel, and different trigger signals trigger different programs of the main control panel to control the power supply duration of the main control panel to the first PCB control panel 222, or allow the main control panel to transmit different valve-opening signals to the first PCB control panel 222, thereby controlling the power supply duration of the first PCB control panel 222 to the DC motor 231, to control the distance pressed down on the transmission lever 235 by the rack 234 and control the lifting height of the valve cover 212 by the transmission lever 235, that is, the opening degree of the mechanical vent valve 21, so as to adjust the venting velocity of the product.

On the basis of this, in the present embodiment, the wireless power supply transmission mode by cooperation of the first flat coil 121 with the second flat coil 221 may be replaced with the wireless power supply transmission mode by cooperation of the first cylindrical coil and the second cylindrical coil. One embodiment is as follows: the first cylindrical coil is electrically connected to the second PCB control panel 122, and the second cylindrical coil is electrically connected to the first PCB control panel 222. The inner diameters of the two cylindrical coils are different. After the cooker lid 2 is screwed into place, the small cylindrical coil is inserted into the large cylindrical coil to achieve the transmission of current and electrical signals through an electromagnetic induction way.

In the present embodiment, the wireless power supply transmission mode by cooperation of the first flat coil 121 with the second flat coil 221 may be replaced with the insertion transmission mode by cooperation of the power plug and the power socket. In the present solution, the transmission of current and electrical signals is realized by electrical connection of the power plug and power socket, rather than an electromagnetic induction way. Therefore, it is not necessary to consider the effect of the power supply distance on the induced magnetic field strength, and the second PCB control panel 122 may be omitted. The particular solution is as follows: one of the power transmitting device 12 and the power receiving device 22 comprises a power socket, and the other comprises a power plug, the power socket and the power plug are electrically connected to the main control panel and the first PCB control panel 222 respectively, when the cooker lid 2 is engaged with the cooker body 1, the insertion of the power plug and the power socket achieves electrical connection, thus achieving the transmission of the current and electrical signals.

In the description of the present disclosure, the terms "first" and "second" are used for the purpose of description only, and are not to be construed as indicating or implying a relative importance unless otherwise explicitly specified and defined.

In the description of the present disclosure, the expressions of reference terms "an embodiment", "some embodiments", "particular embodiments" mean that the specific characteristics, structures, materials or features described in those embodiments or examples are included in at least one embodiment or example of the present disclosure. In the description, the exemplary expression of the above terms may not necessarily refer to the same embodiment or example. Moreover, the specific features, structures, materials, or characteristics described can be combined appropriately in any one or more embodiments or examples. The terms "connected", "mounted", "fixed", etc. should be understood broadly. For example, "connected" may be a fixed connection, a detachable connection, or an integral connection; it may be connected directly or connected indirectly by an intermediary.

What is claimed is:

1. A split-type electric pressure cooker, comprising:
   a cooker body and a cooker lid cooperating with the cooker body, wherein the cooker body includes a power supply device, wherein the split-type electric pressure cooker further comprises:
   a mechanical vent valve, comprising a valve seat and a valve cover, wherein the valve seat is fixedly mounted on the cooker lid, and the valve cover is movably mounted on the valve seat;
   a power transmitting device mounted on the cooker body and is able to be electrically connected to the power supply device, and the power transmitting device transmits power to a power receiving device;
   the power receiving device mounted on the cooker lid;
   a motor driving device, comprising a driving motor mounted on the cooker lid and electrically connected to the power receiving device, and a motor shaft of the driving motor is capable of driving the valve cover to move to open or close the mechanical vent valve; and
   a venting switch and a controller mounted on the cooker body, the controller is electrically connected with the power supply device, the venting switch and the power transmitting device, and the venting switch is configured to send a trigger signal to the controller, so that the controller transmits power to the power transmitting device according to the trigger signal;
   wherein, when the cooker lid is engaged with the cooker body, the power transmitting device cooperates with the power receiving device to realize power transmission; when the cooker lid is opened, the power transmitting device is separated from the power receiving device;
   wherein the driving motor is a DC motor, the power receiving device comprises a first control plate, and the first control plate is electrically connected to the DC motor for transmitting direct current to the DC motor, and controlling the direction of rotation of the DC motor by controlling the direction of the direct current, to open or close the mechanical vent valve;
   wherein the controller or the first control plate is further configured to control a position of the valve cover by controlling the power supply duration of the DC motor, and is configured to control an opening degree of the mechanical vent valve.

2. The split-type electric pressure cooker of claim 1, wherein, the motor driving device further comprises:
   a transmission assembly movably mounted on the cooker lid, and the transmission assembly cooperates with the motor shaft and the valve cover, the driving motor is capable of driving the valve cover to move through the transmission assembly, to open or close the mechanical vent valve.

3. The split-type electric pressure cooker of claim 2, wherein, the transmission assembly comprises:
   a transmission gear fixedly connected to the motor shaft;
   a rotating rod, which is rotably connected to the cooker lid by a rotating shaft, a first end of the rotating rod is provided with an arc surface, the rotating shaft is located at the center of the arc surface, the arc surface is provided with a tooth, and the tooth is engaged with the transmission gear, and a second end of the rotating rod cooperates with the valve cover and may drive the valve cover to move.

4. The split-type electric pressure cooker of claim 2, wherein, the transmission assembly comprises:
   a transmission gear fixedly connected to the motor shaft;
   a rack, which is slidably mounted on the cooker lid, the first end of the rack is engaged with the transmission gear, and the second end of the rack cooperates with the valve cover and may drive the valve cover to move.

5. The split-type electric pressure cooker of claim 2, wherein,
   a transmission gear fixedly connected to the motor shaft;
   a rack slidably mounted on the cooker lid and being engaged with the transmission gear;
   a transmission lever whose middle portion is rotably connected to the cooker lid, the both ends of the transmission lever cooperate with the rack and the valve cover respectively, wherein the transmission lever is configured to drive the valve cover to move under the driving of the rack.

6. The split-type electric pressure cooker of claim 1, wherein,
the power transmitting device comprises a first flat coil, the power supply device is configured to transmit alternating current to the first flat coil, and the power receiving device comprises a second flat coil;
wherein, when the cooker lid is engaged with the cooker body, the first flat coil is opposite to the second flat coil.

7. The split-type electric pressure cooker of claim 6, wherein,
the power receiving device further comprises a rectifying device, the second flat coil is electrically connected to the first control plate through the rectifying device, and the rectifying device converts alternating current transmitted by the second flat coil into direct current and transmit the direct current to the first control plate.

8. The split-type electric pressure cooker of claim 7, wherein,
the rectifying device is a rectifying circuit disposed on the first control plate.

9. The split-type electric pressure cooker of claim 6, wherein,
the power transmitting device further comprises a second control plate, the second control plate is disposed adjacent to the first flat coil or the first cylindrical coil in the power transmitting device, and the second control plate is electrically connected to the first flat coil or the first cylindrical coil and the power supply device.

10. The split-type electric pressure cooker of claim 1, wherein,
the power transmitting device comprises a first cylindrical coil, the power supply device is configured to supply alternating current to the first cylindrical coil, and the power receiving device comprises a second cylindrical coil, and the inner diameter of the first cylindrical coil is not equal to that of the second cylindrical coil;
wherein, when the cooker lid is engaged with the cooker body, one of the first cylindrical coil and the second cylindrical coil extends into the other.

11. The split-type electric pressure cooker of claim 10, wherein,
the power receiving device further comprises a rectifying device, the second cylindrical coil is electrically connected to the first control plate through the rectifying device, and the rectifying device converts alternating current transmitted by the second cylindrical coil into direct current and transmit the direct current to the first control plate.

12. The split-type electric pressure cooker of claim 11, wherein,
the rectifying device is a rectifying circuit disposed on the first control plate.

13. The split-type electric pressure cooker of claim 10, wherein,
the power transmitting device further comprises a second control plate, the second control plate is disposed adjacent to the first flat coil or the first cylindrical coil in the power transmitting device, and the second control plate is electrically connected to the first flat coil or the first cylindrical coil and the power supply device.

14. The split-type electric pressure cooker of claim 1, wherein,
one of the power transmitting device and the power receiving device comprises a power socket, and the other comprises a power plug, and when the cooker lid is engaged with the cooker body, the power plug cooperates with the power socket.

15. The split-type electric pressure cooker of claim 14, wherein,
the power receiving device further comprises a rectifying device, and the power socket or the power plug in the power receiving device is electrically connected to the DC motor through the rectifying device, the rectifying device is configured to convert alternating current transmitted by the power socket or the power plug into direct current and transmit the direct current to the first control plate; or
the power transmitting device further comprises a rectifying device, and the power socket or the power plug in the power transmitting device is connected to the power supply device through the rectifying device, and the rectifying device is configured to convert alternating current transmitted by the power supply device into direct current, and transmit the direct current to the power socket or the power plug connected thereto.

16. The split-type electric pressure cooker of claim 15, wherein,
the rectifying device is a rectifying circuit disposed on the first control plate.

* * * * *